(12) United States Patent
Gao et al.

(10) Patent No.: US 8,497,442 B2
(45) Date of Patent: Jul. 30, 2013

(54) ELECTRONIC DEVICE WITH BUTTON MECHANISM

(75) Inventors: Hai-Peng Gao, Shenzhen (CN); Jie-Yi Shu, Shenzhen (TW); Shou-Ji Liu, Shenzhen (CN); Jian-Hui Dai, Shenzhen (CN); Te-Sheng Jan, New Taipei (TW); Yu-Tao Chen, New Taipei (TW); Chun-Che Yen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 245 days.

(21) Appl. No.: 13/172,850

(22) Filed: Jun. 30, 2011

(65) Prior Publication Data

US 2012/0160644 A1  Jun. 28, 2012

(30) Foreign Application Priority Data

Dec. 28, 2010 (CN) .......................... 2010 1 0608975

(51) Int. Cl.
*H01H 9/14* (2006.01)
(52) U.S. Cl.
USPC ......................................... 200/317; 200/314

(58) Field of Classification Search
USPC ................. 200/312–317, 341, 345, 520, 293, 200/296; 362/23, 24, 29
See application file for complete search history.

(56) References Cited

U.S. PATENT DOCUMENTS

| | | | | |
|---|---|---|---|---|
| 4,013,857 A * | 3/1977 | Tanaka | ........................... | 200/315 |
| 4,489,227 A * | 12/1984 | Lamarche | ..................... | 200/314 |
| 4,868,354 A * | 9/1989 | Ray et al. | ...................... | 200/317 |
| 6,855,899 B2 * | 2/2005 | Sotome | ......................... | 200/317 |
| 7,309,856 B2 * | 12/2007 | Yamamoto | .................... | 200/317 |
| 2007/0246340 A1 * | 10/2007 | Zhao et al. | ..................... | 200/339 |

* cited by examiner

*Primary Examiner* — Briggitte R Hammond
(74) *Attorney, Agent, or Firm* — Altis Law Group, Inc.

(57) ABSTRACT

An electronic device includes a housing defining an opening, a button mechanism, and a fixing portion. The button mechanism includes a button cap depressibly received in the opening, a light guiding plate with the button cap mounted on a first side thereof, and a connecting portion. The connecting portion is mounted on an opposite second side of the light guiding plate, and includes a resisting member, and a tab protruding from the resisting member. The fixing portion is received in the housing, and includes a block defining a slot with the tab extending therethrough, an light source for illuminating the light guide plate, a switch to switch on or off the light source and the electronic device. The switch is configured to switch on or off the light source and the electronic device. The button mechanism is depressible so as to enable the resisting member to actuate the switch.

8 Claims, 5 Drawing Sheets

ELECTRONIC DEVICE WITH BUTTON MECHANISM

BACKGROUND

1. Technical Field

The present disclosure relates to an electronic device with a button mechanism.

2. Description of Related Art

Many electronic devices include a power button mechanism with a button received in an opening of the electronic device, a light guiding plate connecting with the button, and a light emitting module arranged in the electronic device. The button is made of plastic material, and the light guiding plate is made of material with good light transmittance. The light guiding plate is received in the electronic device, and is partially visible from the opening. When a user slides the button, the light emitting module is actuated and emits light beams through the light guiding plate. The light guiding plate is illuminated, for prompting the user that the electronic device is powered on. However, the button mechanism is usually formed by a complicated double shot molding process. Thus, a complex mold is required, which increases the cost of the electronic device.

Therefore, what is needed is an electronic device with a button mechanism that alleviates the limitations described above.

BRIEF DESCRIPTION OF THE DRAWINGS

The components in the drawings are not necessarily drawn to scale, the emphasis instead being placed upon clearly illustrating the principles of an electronic device with a button mechanism thereof. Moreover, in the drawings, like reference numerals designate corresponding parts throughout the several views.

DETAILED DESCRIPTION

Figure 1:
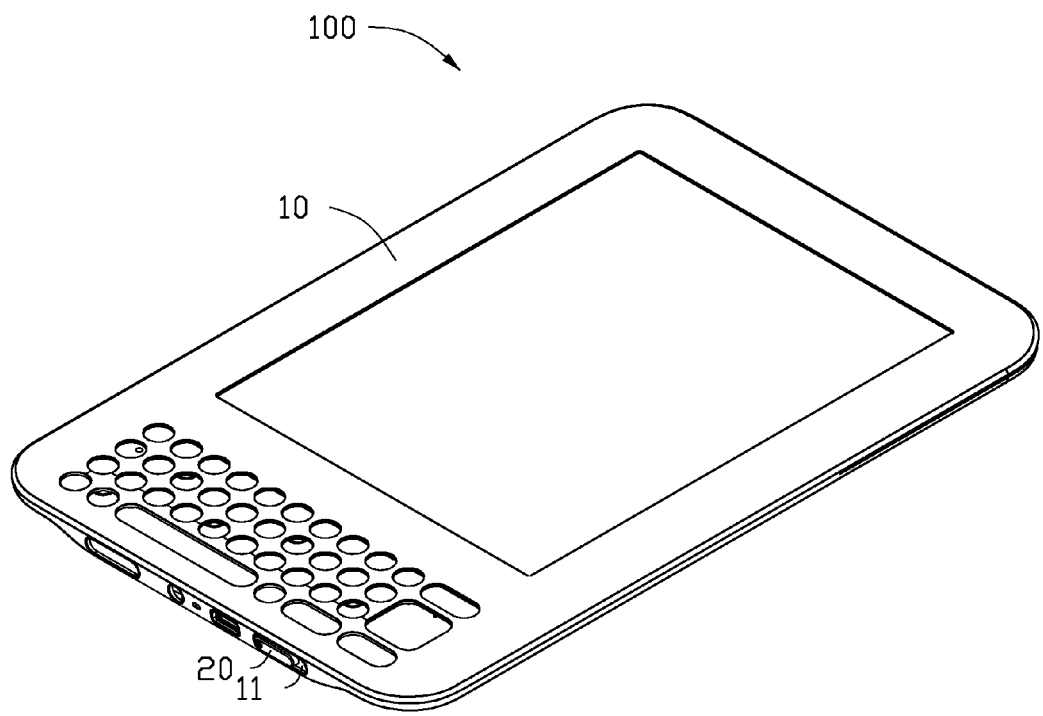
FIG. 1 is an isometric view of an exemplary embodiment of an electronic device with a button mechanism thereof.

Referring to FIG. 1, an electronic device 100 is disclosed as an exemplary embodiment. The electronic device 100 includes a housing 10 defining an opening 11 at its lower end, and a spring-loaded button mechanism 20 equipped in the housing 10 and partially extending from the opening 11. In the embodiment, the electronic device 100 is an electronic reader.

Figure 2:
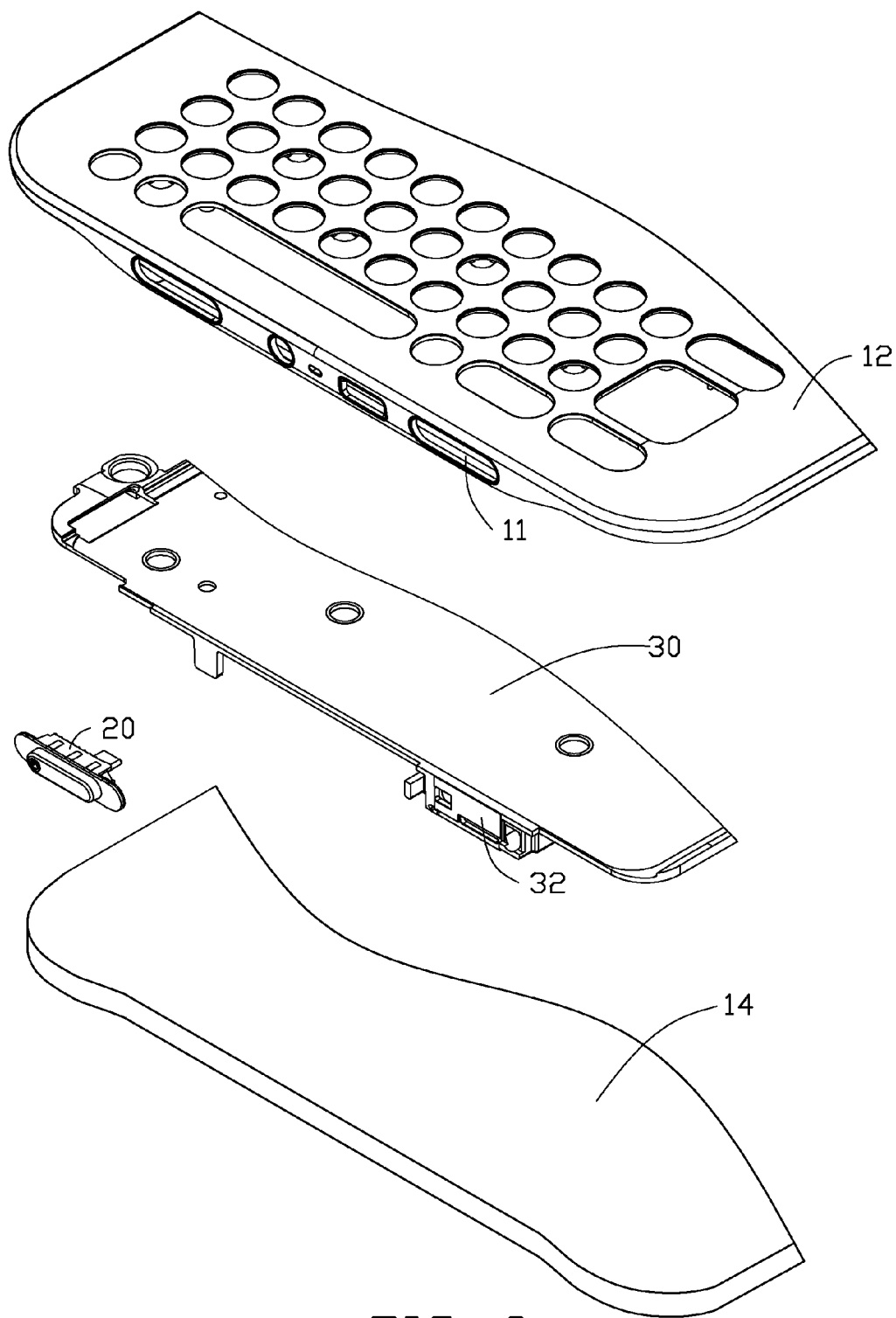
FIG. 2 is an exploded view of the electronic device of FIG. 1.

Referring to FIG. 2, the housing 10 includes an upper cover 12, and a lower cover 14 cooperating with the upper cover 12. The electronic device further includes a circuit board 30 received in the housing 10. The circuit board 10 includes a fixing portion 32 mounted on the circuit board 30, aligned along an edge of the circuit board 30, and corresponding to the opening 11, for slidably fixing the button mechanism 20 on the upper cover 12.

Figure 4:
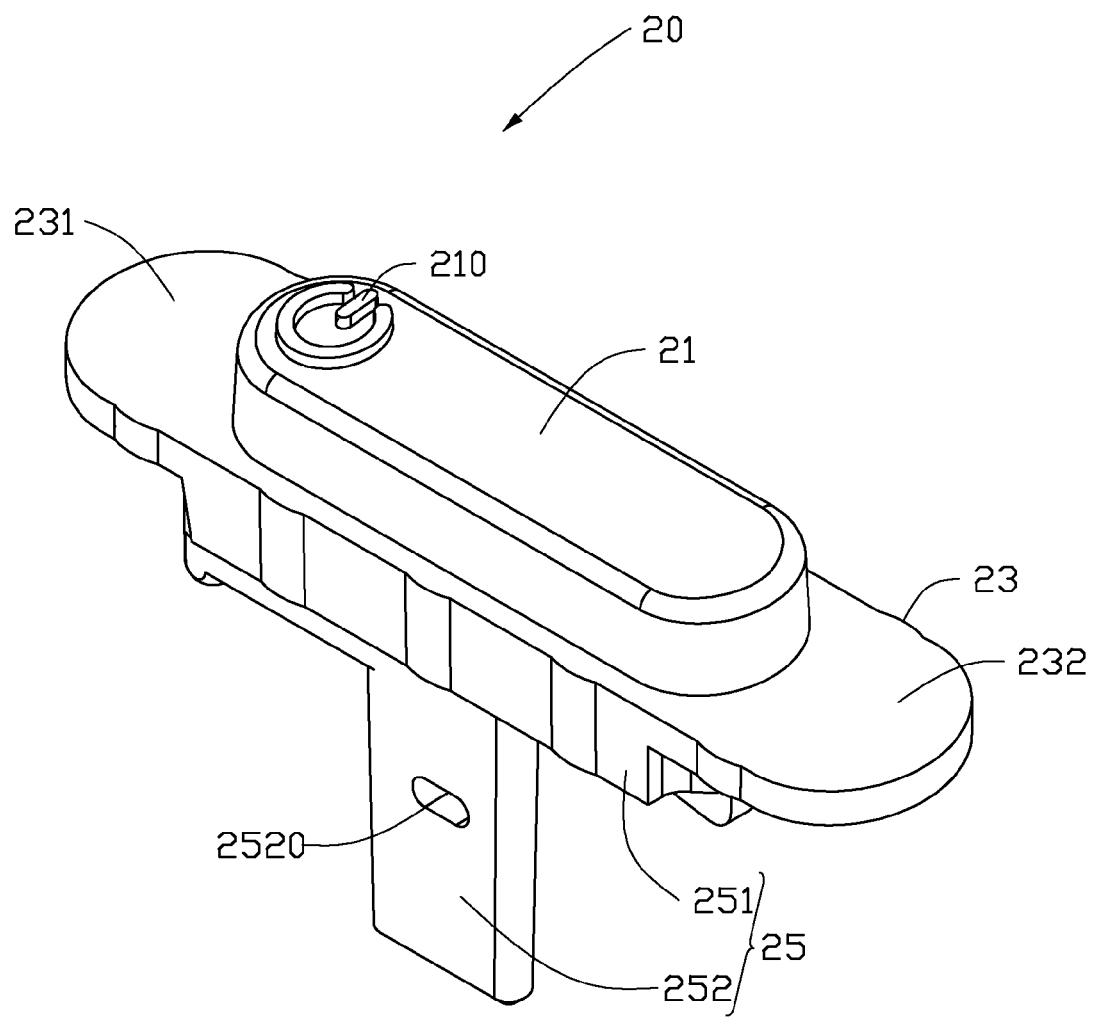
FIG. 4 is an isometric view of the button mechanism of the electronic device of FIG. 1.
Figure 5:
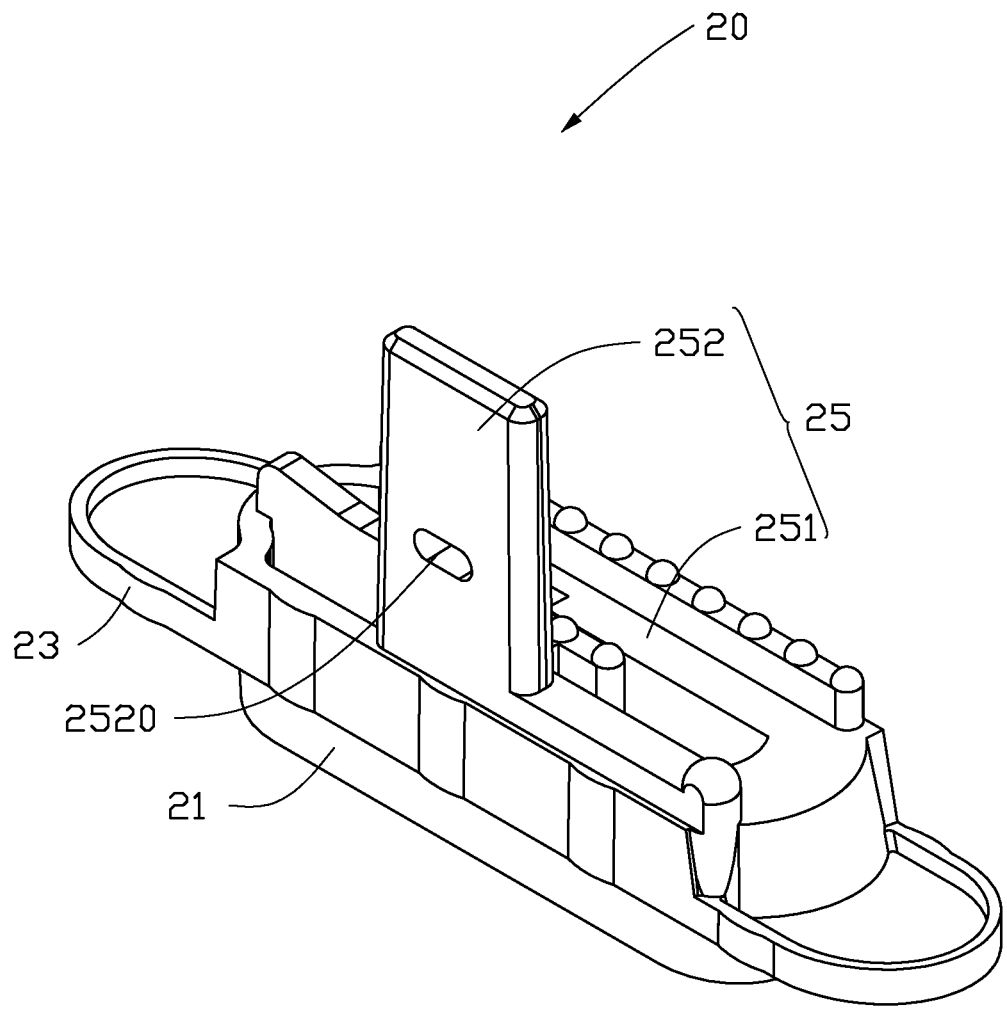
FIG. 5 is another isometric view of the button mechanism of the electronic device of FIG. 1, viewed from another perspective.

Referring to FIGS. 4 and 5, the button mechanism 20 is a unitary piece and is made of semitransparent material. The button mechanism 20 includes a button cap 21, a light guiding plate 23 larger than the button cap 21, and a connecting portion 25. The button cap 21 and the connection portion 23 are mounted on two opposite sides of the light guiding plate 22. The light guiding plate 23 includes portions exposed at the opening 11.

The button cap 21 is depressibly received in the opening 11. A power button icon 210 is formed on one end of the upper surface of the button cap 21. The light guiding plate 23 includes a first light guiding area 231 and a second light guiding area 232 that are at opposite sides of the button cap 21. The length of the opening 11 is equal to the length of the button cap 21 plus the length of the first light area 231 or the second light guiding area 232. The connecting portion 25 includes a resisting element 251, and a tab 252 protruding from the resisting element 251. The tab 252 defines a first fixing hole 2520. The resisting element 251 is used for actuating a switch 3230 on the circuit board 30 when the button cap 20 slides to an actuation position.

Figure 3:
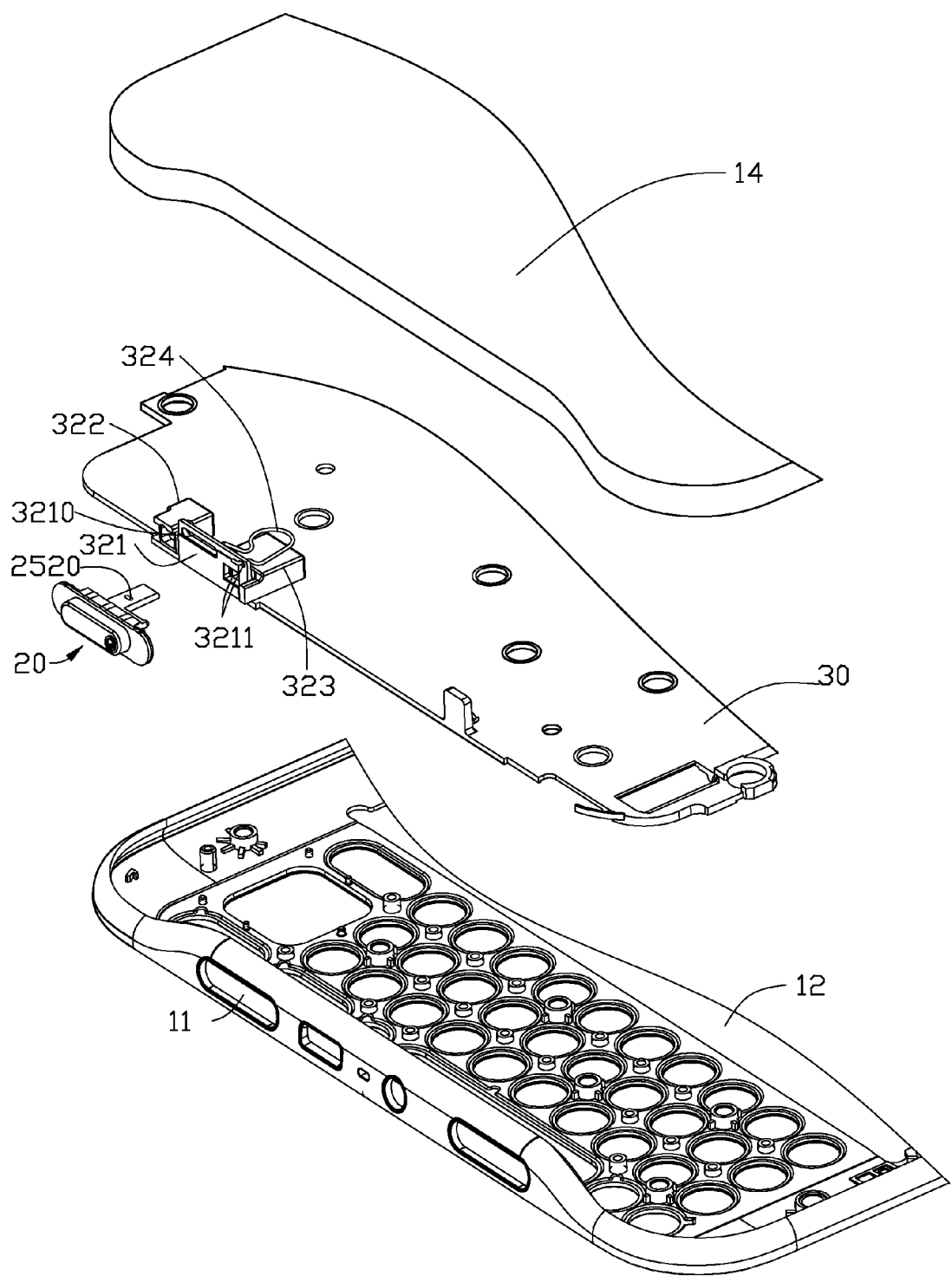
FIG. 3 is another exploded view the electronic device of FIG. 1, viewed from another perspective.

Referring to FIG. 3, the fixing portion 32 includes a block 321 vertically protruding from the edge of the circuit board 32, a light source 322 for illuminating the light guide plate 23, a switch 323, and an elastic element 324. The switch 323 includes a switch 3230 for controlling the light source 322 and the power supply of the electronic device 100 depressibly actuated by the resisting element 251. The block 321 defines a slot 3210 extending along the sliding direction of the button cap 21, and a second fixing hole 3211. In the embodiment, the light source 322 is powered on at the time the switch 3230 is actuated, and is powered off after the switch 3230 is actuated. The electronic device 100 is powered on when the switch 3230 is actuated, and is powered off when the switch 3230 is actuated again. In the embodiment, the light source is an LED lamp.

One end of the elastic element 324 penetrates the first fixing hole 2520 and is fixed on the button mechanism 20. The other end of the elastic element 324 is fixed in the second fixing hole 3211. In the embodiment, the elastic element 324 is a resilient metal wire. The elastic element 324 can be elastically deformed when the button cap 21 is slid in the opening 11. The button cap 21 can return to its normal, initial position because of the elastic restoring force of the elastic element 324 when the external force is released. In other embodiments, the elastic element 324 may be a spring or other elements that can be elastically deformed.

In use, the button cap 21 can be pushed to slide in the opening 11, until the resisting element 251 actuates the switch 323. The electronic device 100 and the light source 322 are then powered on. The first and second light guiding areas 231, 232 are illuminated. The button cap 21 can be further slid, until the upper cover 12 shields the second light guiding area 232. After that, a user can release the button cap 21, the button cap 21 is then urged by the elastic element 324 and returns to its initial position. The light source 322 is powered off, and the electronic device 100 remains powered on.

The button cap 21 is slide towards the second light guiding area 232 again, and causes the button mechanism 20 to slide accordingly, until the resisting element 251 resists the switch 323. The switch is depressed and is actuated again by the resisting element 251. The first and second light guiding areas 231, 232 are illuminated. The electronic device 100 is powered off. The button cap 21 is slid continually until the upper cover 12 shields the second light guiding area 232. The first light guiding area 231 can be seen from the opening 11. Then the external force on the button cap 21 is released, the button mechanism 20 returns to the initial state because of the elastic restoring force of the elastic element 324. Both the LED and the electronic device 100 are powered off.

With such configuration, the button mechanism 20 is an integral configuration, one injection is enough for molding the button mechanism 20 of the electronic device 100. Thus, the mold is simplified, which decreases the cost of the electronic device 100.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
    a housing defining an opening;
    a spring-loaded button mechanism, comprising:
        a button cap depressibly received in the opening;
        a light guiding plate with the button cap mounted on a first side thereof; and
        a connecting portion mounted on an opposite second side of the light guiding plate, the connecting portion comprising a resisting member, and a tab protruding from the resisting member; and
    a fixing portion received in the housing, the fixing portion comprising:
        a block defining a slot with the tab extending therethrough;
        a light source for illuminating the light guide plate; and
        a switch configured to switch on or off the light source and the electronic device, the button mechanism being depressible so as to enable the resisting member to actuate the switch.

2. The electronic device as described in claim 1, wherein the button mechanism is a unitary piece and is made of semi-transparent material.

3. The electronic device as described in claim 1, further comprising a circuit board received in the housing, the fixing portion mounted on the circuit board and aligned along an edge thereof.

4. The electronic device as described in claim 1, wherein a power button icon is formed on the button cap.

5. The electronic device as described in claim 1, wherein the light guide plate comprises portions exposed at the opening.

6. The electronic device as described in claim 1, wherein the button mechanism comprises a resilient metal wire resiliently coupled between the fixing portion and the tab, the metal wire is configured for applying a rebounding force to the button mechanism.

7. The electronic device as described in claim 1, wherein the electronic device is an electronic reader.

8. The electronic device as described in claim 1, wherein the light guiding plate comprises a first light guiding area and a second light guiding area, and the first and second light guiding areas are at opposite sides of the button cap.

* * * * *